United States Patent
Couturier et al.

(10) Patent No.: US 11,100,046 B2
(45) Date of Patent: Aug. 24, 2021

(54) INTELLIGENT SECURITY CONTEXT AWARE ELASTIC STORAGE

(71) Applicant: International Business Machines Corporation, Armonk, NY (US)

(72) Inventors: Russell L Couturier, Worchester, MA (US); Vijay Dheap, Durham, NC (US); Derek T Lohnes, New Maryland (CA); Ben A Wuest, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/006,075

(22) Filed: Jan. 25, 2016

(65) Prior Publication Data
US 2017/0214718 A1    Jul. 27, 2017

(51) Int. Cl.
*G06F 16/16* (2019.01)
*H04L 29/06* (2006.01)
*G06F 16/11* (2019.01)

(52) U.S. Cl.
CPC .......... *G06F 16/162* (2019.01); *G06F 16/125* (2019.01); *H04L 63/0254* (2013.01); *H04L 63/1408* (2013.01); *H04L 63/1425* (2013.01); *H04L 63/20* (2013.01)

(58) Field of Classification Search
CPC ............ H04L 63/205; H04L 63/0254; H04L 63/1408; G06F 17/30085; G06F 17/30117
See application file for complete search history.

(56) References Cited

U.S. PATENT DOCUMENTS

| | | | | |
|---|---|---|---|---|
| 6,917,980 B1 * | 7/2005 | Gusler | ................ | G06F 16/9535 709/229 |
| 7,644,150 B1 * | 1/2010 | Nucci | ................ | H04L 41/0893 706/12 |
| 7,831,566 B2 * | 11/2010 | Kavuri | ................ | G06F 16/10 707/651 |
| 8,184,540 B1 * | 5/2012 | Perla | ................ | H04L 47/568 370/235 |
| 8,339,959 B1 * | 12/2012 | Moisand | ............ | H04L 63/0236 370/235 |

(Continued)

FOREIGN PATENT DOCUMENTS

EP    2974215 A1 *   1/2016   ......... H04L 63/1441

OTHER PUBLICATIONS

Horneman et al "Smart Collection and Storage Method for Network Traffic Data," Carnegie Mellon University, Sep. 2014, pp. 1-75 (Year: 2014).*

*Primary Examiner* — Luu T Pham
*Assistant Examiner* — James J Wilcox
(74) *Attorney, Agent, or Firm* — Jeffrey S Labaw; John L Kennel; Diana R Gerhardt

(57) ABSTRACT

A method, apparatus and computer program product for selectively storing network traffic data are described. Network traffic is stored according to a first packet filtering policy in a first repository. The stored network traffic is scanned in the first repository according to a second packet filtering policy to identify a subset of network traffic for archiving. The identified subset of network traffic identified by the second packet filtering policy are forensically interesting packets concerning a security issue. The identified subset of network traffic from the first repository is then stored in a second repository.

17 Claims, 8 Drawing Sheets

(56) References Cited

U.S. PATENT DOCUMENTS

| | | | |
|---|---|---|---|
| 8,666,985 B2 | 3/2014 | Wood et al. | |
| 8,824,466 B2 | 9/2014 | Won et al. | |
| 8,931,036 B1* | 1/2015 | Cherukumudi | G06F 21/6218 726/1 |
| 8,949,192 B2 | 2/2015 | Kaijima et al. | |
| 9,094,445 B2* | 7/2015 | Moore | H04L 63/1441 |
| 9,177,293 B1* | 11/2015 | Gagnon | G06Q 10/107 |
| 9,210,090 B1* | 12/2015 | Baldi | H04L 47/2441 |
| 9,418,162 B2* | 8/2016 | Hariharan | H04L 67/306 |
| 9,807,121 B1* | 10/2017 | Levy | H04L 63/205 |
| 10,469,498 B2* | 11/2019 | Numajiri | H04L 63/1441 |
| 2001/0053694 A1* | 12/2001 | Igarashi | H04L 67/14 455/433 |
| 2004/0022186 A1* | 2/2004 | Kump | H04L 43/00 370/229 |
| 2004/0158643 A1* | 8/2004 | Suzuki | H04L 63/0218 709/232 |
| 2004/0209634 A1* | 10/2004 | Hrastar | H04L 63/1441 455/515 |
| 2006/0168329 A1* | 7/2006 | Tan | G06F 21/554 709/238 |
| 2006/0177004 A1* | 8/2006 | Gilbert | H04L 43/12 379/40 |
| 2007/0204154 A1* | 8/2007 | Swander | H04L 63/0218 713/166 |
| 2007/0250935 A1* | 10/2007 | Zobel | G06F 21/577 726/26 |
| 2009/0144819 A1* | 6/2009 | Babbar | H04L 47/10 726/13 |
| 2010/0309800 A1* | 12/2010 | Fahmy | H04L 63/0236 370/252 |
| 2011/0051614 A1* | 3/2011 | Li | H04L 63/123 370/252 |
| 2011/0125749 A1* | 5/2011 | Wood | H04L 43/026 707/737 |
| 2012/0239652 A1* | 9/2012 | Wood | G06F 17/30516 707/737 |
| 2013/0081102 A1* | 3/2013 | Beauvais | H04L 63/0263 726/1 |
| 2014/0051372 A1* | 2/2014 | Shoshan | H04M 1/72519 455/90.2 |
| 2014/0165133 A1* | 6/2014 | Foley | H04L 63/14 726/1 |
| 2014/0181438 A1 | 6/2014 | Varadharajan et al. | |
| 2014/0317738 A1* | 10/2014 | Be'ery | H04L 63/14 726/23 |
| 2014/0317739 A1* | 10/2014 | Be'ery | H04L 63/16 726/23 |
| 2014/0317740 A1* | 10/2014 | Be'ery | H04L 63/14 726/23 |
| 2014/0317741 A1* | 10/2014 | Be'ery | H04L 63/30 726/23 |
| 2015/0128267 A1 | 5/2015 | Gupta et al. | |
| 2015/0128274 A1* | 5/2015 | Giokas | H04L 63/1416 726/23 |
| 2015/0149489 A1* | 5/2015 | Hariharan | G06F 16/24564 707/754 |
| 2015/0180894 A1* | 6/2015 | Sadovsky | H04L 67/22 726/22 |
| 2015/0207806 A1* | 7/2015 | Be'ery | H04L 63/30 726/23 |
| 2015/0264041 A1* | 9/2015 | Budhani | H04L 63/0281 713/156 |
| 2015/0358292 A1* | 12/2015 | Karale | H04L 63/0263 726/11 |
| 2016/0021059 A1* | 1/2016 | Pietrowicz | G01R 1/20 726/13 |
| 2016/0080406 A1* | 3/2016 | Sadovsky | H04L 63/1425 726/23 |
| 2016/0080545 A1* | 3/2016 | Shoshan | H04M 1/72519 455/560 |
| 2016/0112287 A1* | 4/2016 | Farmer | H04L 43/04 709/224 |
| 2016/0286289 A1* | 9/2016 | Long | H04Q 11/0001 |

* cited by examiner

INTELLIGENT SECURITY CONTEXT AWARE ELASTIC STORAGE

BACKGROUND OF THE INVENTION

Technical Field

This disclosure relates generally to monitoring security events in a network environment. More particularly, it relates to context related storage of detected events in a network environment for security processing.

Background of the Related Art

Security for a network connected to the Internet is increasingly difficult. Attacks on the network often start as an intrusion on the network infrastructure to analyze the environment to find vulnerabilities to gain unauthorized access to network resources. Once the needed information is acquired, the attack can quickly escalate; the hacker accesses, alters, disable or destroys the network resources and data. There are many types of network attacks, malware, viruses, phishing, denial of service, man in the middle, and so forth. Consequently, a computer security industry has grown using many different technologies to protect computer networks from these threats.

One technology used in securing a network is packet capture. Packet capture is generally accomplished using a standalone appliance dedicated to packet capture and placed at entrances to the network, such as the network's connections to the Internet, or around critical devices such as servers containing mission critical or sensitive information. Typically, a packet capture device is configured to capture all network packets from a set of designated source, although some can be configured with a user defined filter to capture a subset of the network traffic. For certain security operations, such as incident forensics and intrusion detection, full packet capture is generally employed as security threats continually evolve and it is difficult to predict which network packets will be useful to analyze a new threat.

BRIEF SUMMARY

According to this disclosure, a method, apparatus and computer program product for selectively storing network traffic data are described. Network traffic is stored according to a first packet filtering policy in a first repository. The stored network traffic is scanned in the first repository according to a second packet filtering policy to identify a subset of network traffic for archiving. The identified subset of network traffic identified by the second packet filtering policy are forensically interesting packets concerning a security issue. The identified subset of network traffic from the first repository is then stored in a second repository.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, the present invention employs a first and a second repository to store network traffic information, particularly captured packets. A first filtering policy is used to store traffic in the first repository. In a packet capture utility used for incident forensic work, typically, all of the packets from a set of target machines will be stored, because of the difficulty in knowing which packets will become useful in the event of a new threat. A second filtering policy is used to copy or transfer traffic stored in the first repository. In preferred embodiments, the second filtering policy is one or more filtering policies created by a security application, once a set of suspicious or interesting set of packets related to a possible security event have been identified. Because only a small percentage of the packets will be identified by the second filtering policy, interesting packets can be stored for much longer duration than in prior art packet capture utilities.

Packet capture for incident for forensics requires that all data is stored from vulnerable or mission critical assets in the network, consuming a tremendous amount disk resource. A prior art 64 Terabyte repository may only provide a few days of forensic visibility at 10 Gbit speeds. When the repository is filled, stored packets are removed for newer packets on a FIFO basis. The drawback to this solution is twofold. There is only a small window of visibility of any forensically interesting data. To expand this window, an organization is required to purchase massive amounts of storage for longer term visibility of packets related to security events.

The invention provides an alternative solution which preserves the interesting packets at little additional cost in storage.

Figure 1:
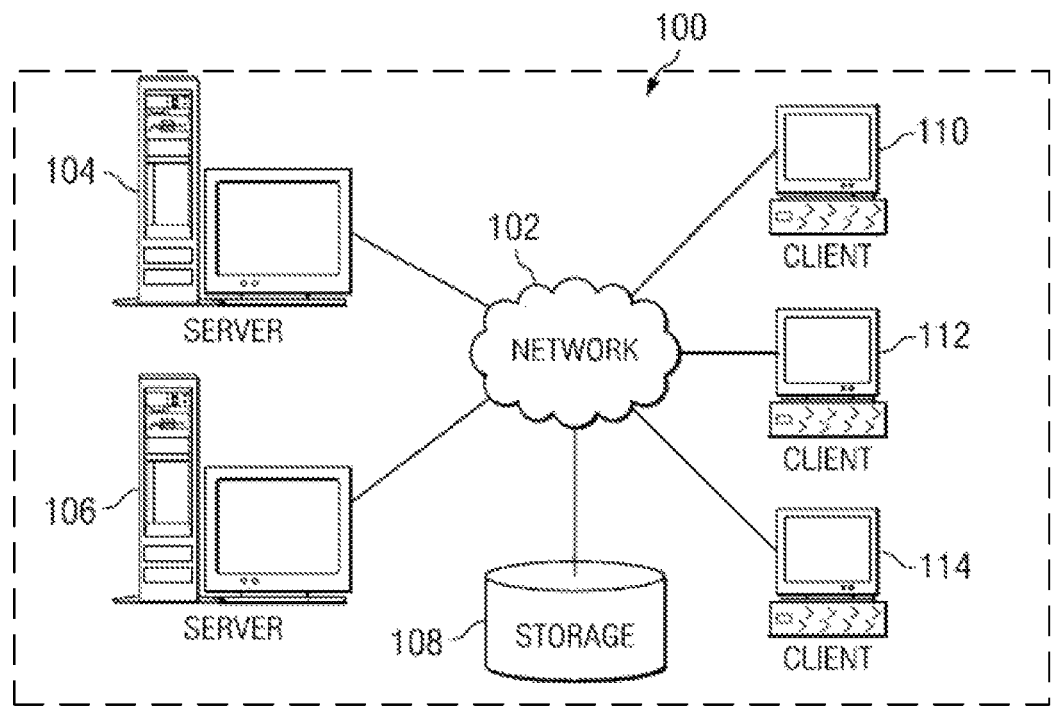
FIG. 1 depicts an exemplary block diagram of a distributed data processing environment in which exemplary aspects of the illustrative embodiments may be implemented.
Figure 2:
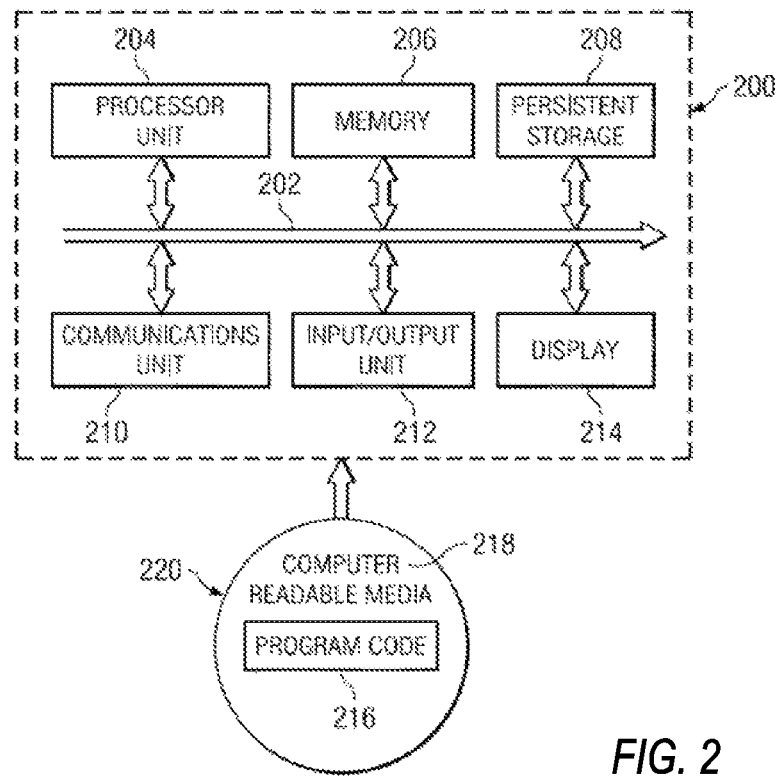
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
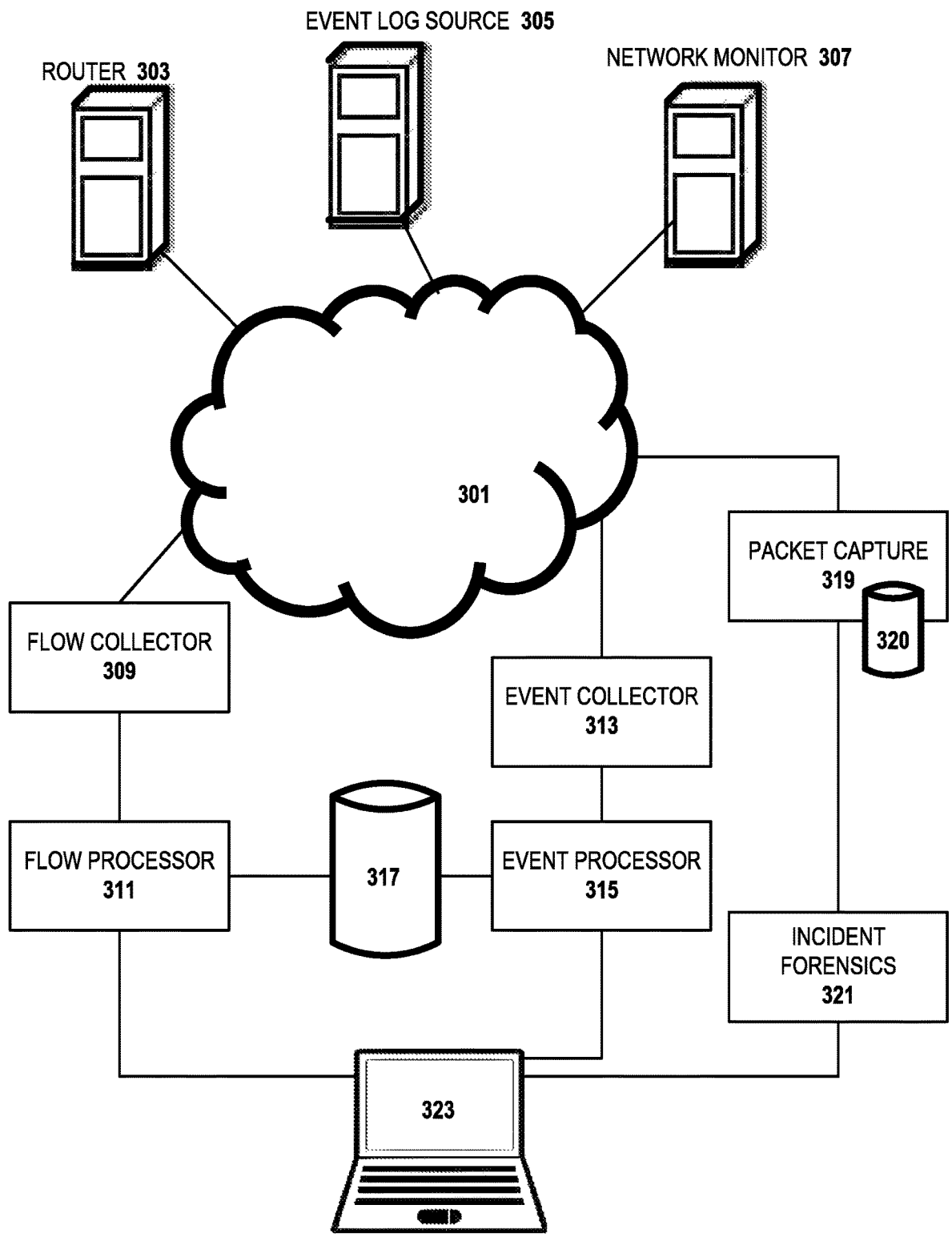
FIG. 3 illustrates an exemplary computing architecture in which the disclosed subject matter may be implemented.

FIG. 3 illustrates an exemplary computing architecture in which the disclosed subject matter may be implemented. As shown in the drawing, a network as discussed above in connection with FIG. 1 may be augmented by a plurality of security related components to detect threats. FIG. 3 shows the additional security components rather than the clients and servers being protected as shown in FIG. 1.

The network 301 has a plurality of network components such as router 303, event log source 305 and network monitor 307 which collect different types of network events, a small percentage of which may be interesting from a security standpoint. The flow collector 309 collects traffic flows from the network through span ports or network taps or through the collection of external flow-based data sources. The flow processor 311 assesses the collected flows, e.g., based on application level data, to determine whether the collected flow represents a new or known security threat.

The event collector 313 gathers events from network sources such as local and remote log sources. The collector 313 do some basic event processing such as normalization, aggregation and event tagging and sends the information to the event processor 315. The event processor 315 processes events that are collected from one or more event collectors 313. Storage node(s) 317 add storage and processing capacity for the flow processor 311 or event processor 315 as required. When either the flow processor 311 or event processor 315 recognize that the collected flow or collects events indicate behavioral changes or policy violations which may indicate a security event, notifications are sent to the admin console 323.

A packet capture appliance 319 captures network packets from one or more systems in the network. Typically, systems which face external networks or mission critical systems are candidates for packet capture monitoring. A storage device 320 stores the massive amounts of packet data accumulated. The captured packet data can be used by another security application such as incident forensics application 321. The application 321 is used investigate security events to determine the root cause of the event and design corrective and preventive actions. The incident forensics application can be used as a standalone application or be integrated with the admin console 323.

The admin console 323 provides the user interface which contains information such as event and flow views, reports, offenses, asset information, and administrative functions. It allows the administrator to manage hosts other security components such as the Flow processor 311 and event processor 315. The console can allow the administrator to create new security rules indicating which events or flow other components should monitor and report upon. Typically, because of the large number of events in a network, the user interface will prioritize the events based on factors including number of similar events occurring, severity of events, relevance of events to a particular problem being studied, and credibility of the data or data source.

Packet capture for security forensics requires that all data is stored, consuming a tremendous amount of storage resources. As mentioned above, a 64 Terabyte repository may only provide a few days of forensic visibility at 10 Gbit speeds. When the repository is filled, stored packets are removed for newer packets on a first-in-first-out (FIFO) basis. The prior art solutions present a user with two unattractive alternatives: a) the user can supply a reasonable amount of storage, e.g., 64 Terabytes, but only receive a small window of visibility of any forensically interesting data; or b) the user can purchase massive amounts of storage for longer term visibility. The present invention provides a better solution.

Embodiments of the invention use an "elastic storage" capture environment which comprises two or more storage vaults with respective storage capacities. A first repository is used to store network traffic by the packet capture utility according to a first filtering policy. For example, the first filtering policy in a first embodiment can be that all of the packets received by or transmitted by a network system which is being monitored by the security apparatus would be stored in the first repository. As another example, a first filtering policy in a second embodiment is to store all network traffic collected by a network switch or network router. A second filtering policy is used to transfer selected packets stored in the first repository to more permanent storage in the second repository. In one embodiment, a security application, e.g., a third party intrusion detection application, will provide the packet capture utility a filtering policy for storing selected forensically interesting traffic in the first repository to the second repository. Since only a relative few packets will pass the second filtering policy, the retention time of the selected packets in the second repository can be much longer than those packets stored in the first repository.

Figure 4:
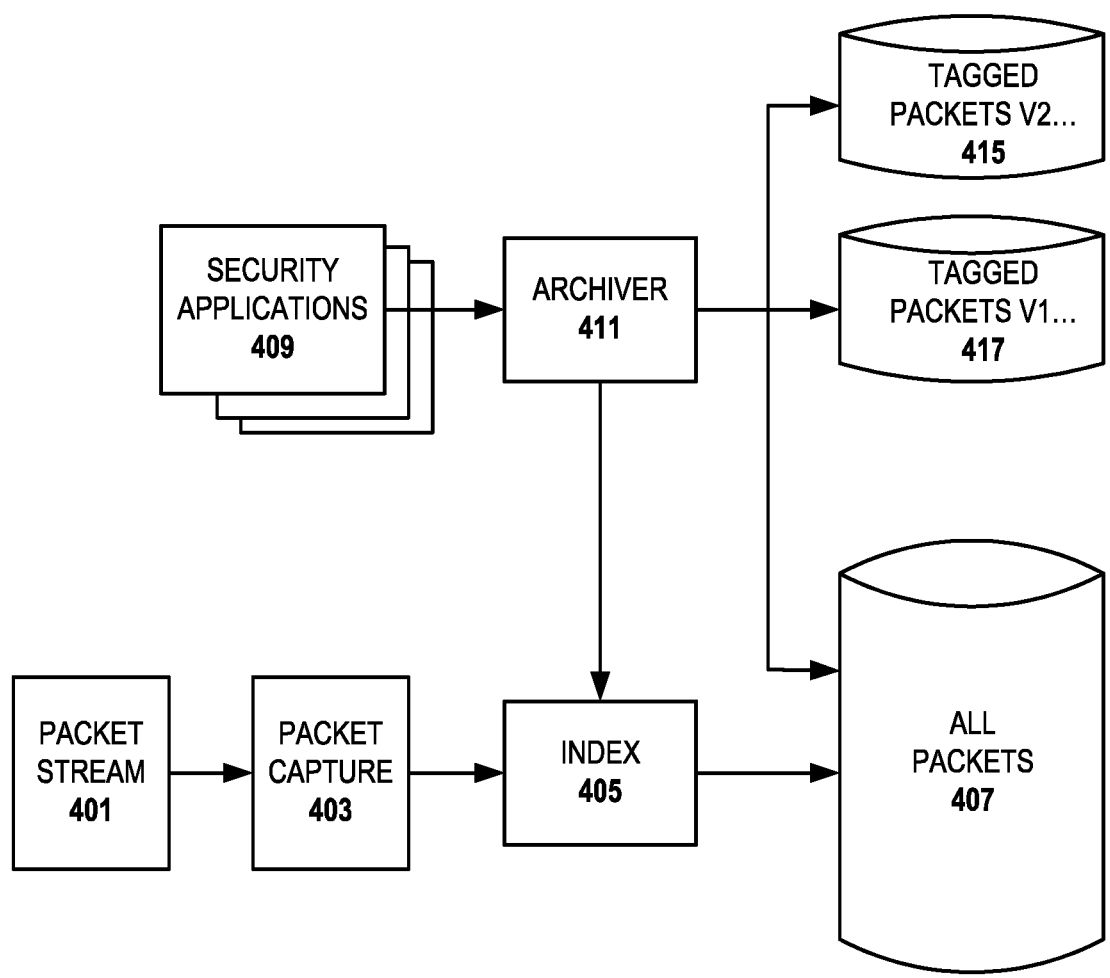
FIG. 4 is an architectural diagram of an intrusion detection mechanism used in a preferred embodiment of the invention.

FIG. 4 is an architectural diagram of a preferred embodiment of the invention. A packet stream 401 is fed by a packet capture utility 403 in to a packet indexer 405. The packet indexer 405 indexes the packets before the packets are stored in the first repository 407. The process of indexing and storing the packets is called "ingestion". A typical filtering policy for storage in the first repository 407 would be to store all packets to and from a selected target system. However, other filtering policies can be used to limit the packet storage, e.g., only packets which have certain characteristics are stored. In general, because of the variety of attacks which can be upon a network, and the sheer number and difficulty of storing the network packets, the first filtering policy for the first repository will generally be fairly inclusive. The packet capture environment indexes 405 network packets on ingestion. Indexing is used so that "interesting packets" can be retrieved from the first repository 407. The determination of what is "interesting" is based on the search parameters of a one or more security applications, represented in the drawing as security applications 409. In one preferred embodiment, the captured packets are saved in the first repository 407 as files in a standard format, e.g., PCAP, with time stamps indicating the time of capture. The capture files may be stored in sequential order, or based on the file size in directories or other file structures. When the space in the first repository 407 becomes full, the capture files are overwritten, based on preconfigured storage parameters such as FIFO.

An Archiver process 411 scans the indexes created on ingestion, and copies forensically interesting packets to a secondary storage according to a second filtering policy. The secondary storage is shown in the diagram as second repository 417. In the preferred embodiments of the invention, the Archiver process is a definable, scheduled process which repeats the scan of the indexes on a periodic basis. The second filtering policy can be based on a previous search of a security application. Once search parameters are received from the security application, the archiver can convert the search parameters into a filtering policy. The second filtering policy in most preferred embodiments will be a collection of filtering policies each of which describing a particular set of interesting packets. In one preferred embodiment, the Archiver process 411 knows what is forensically interesting because it was notified by a security application 409 by a request to install a filtering policy. The collection of filtering policies characterize packets which the security application has identified over the course of monitoring the network. The collection of filtering policies may include a certain number of default filtering policies. The security application 409 can specify the length of interest, i.e. how long the filtering policies should be in place and how long packets should be retained in the second repository, in addition to the packet characteristics of interesting packets. For example, the filtering policies may have retention parameters like "packets like this are interesting for a deterministic period", "packets like this are interesting forever", or "packets like this are interesting for until termination is expressly indicated". In addition, the characteristics for identifying an interesting packet can be expressed in packet characteristics such as IP address, source, destination, etc., or in terms of "flows" and "patterns" indicative of an intrusion. Packets stored in secondary storage 417 can be "tagged" according to the particular filtering policy which caused them to be retained as well as their retention parameter. In the absence of a requested retention parameter, default retention parameters can be used, both for how long a given filtering policy will be in effect as well as how long packets should be retained in the second repository.

Timing of the creation of the second filtering policies is an important aspect. The third party security application may not know what is forensically interesting until minutes after the network packets are first ingested and stored in the first repository. So in some cases, it would be too late for the capture environment to "tag" the captured packets for long term retention at the time of ingestion. By having a scheduled secondary process, the Archiver 411, that filters the packets, the capture environment can "go back in time" and "copy" the forensically interesting packets. In preferred embodiments, the scanning interval of the "archiver" operation by the capture platform is selected to be greater than the average window of time needed to detect forensically interesting packets by a third party application. Another factor is the longevity of packets in the first repository. The scanning interval of the archiver needs to be frequent enough that the network packets in the first repository will not have aged out due to storage space constraints. Otherwise interesting network packets may miss being archived in the second repository.

For example, the inventors estimate that the third party security applications 409 would select or "tag" less than 1 percent of the packets. Thus, the forensically interesting packets in the secondary vaults 417 using comparable amounts of storage to prior art packet capture utilities would enable retrieval and visibility by the security applications 409 for hundreds of days, if not years. In one embodiment of the invention, the third party application 409 can determine (on average) forensically interesting packets within 30 minutes of ingestion. In this case, the Archiver 411 is configured to run at a period of every hour or more, but at least as frequently as every day, so that the Archiver 411 run more frequently than the packets will age out.

The security application 409 which creates the second filtering policy to notify the packet capture environment can be one or more third party security applications. The security application 409 can be one provided by the vendor of the elastic storage environment and be either standalone or integrated into the environment. The security application 409 could be a Security information and event management (SIEM) application such as the IBM Security QRadar or HP ArcSight SIEM products. SIEM technology provides a real-time analysis of security alerts generated by network hardware and applications. SIEM products are sold as software, appliances or managed services, and are also used to log security data and generate reports for compliance purposes. The security application could be a network intrusion prevention application or appliance such as the IBM Security Network Protection XGS or Cisco Intrusion Prevention System products. Network intrusion prevention applications perform one or more processes such as SSL/TLS inspection, application control and IP reputation analysis to detect possible security threats. In addition to known signatures of known exploits, network intrusion prevention applications provide behavior based methods of detecting new, undiscovered security threats. The security application 409 can be an endpoint malware detection application such as the IBM Trusteer or the Viewfinity suites of products. Malware detection is an additional layer of security to antivirus software, and protects against exploits such as phishing, screen scraping, session hijacking, man-in-the-middle, and so forth. The security application 409 can be other types of software such as an antivirus software or an incident forensics software such as the IBM Security Incident Forensics product.

One common capability in many present day security applications is that they can create new filtering policies based on new threats or new analysis of the user environment. In preferred embodiments of the invention, the existing or new filtering policies from the security application 409 are translated by the Archiver 411 into a format consistent with the index so that network packets stored in the first repository 407 which meet the definitions in the second filtering policy can be copied into the second repository 417. Alternatively, the security application 409 can send the second filtering policy to the Archiver 411 in the indexing format. The security application can send the second filter in a workload message, based upon a security event to the retrieve all packets from the packet capture appliance associated with the security event. The association between the security event and the packets to be retrieved is made by providing a BPF (Berkley Packet Filter) filter that matches the timeframe, IP address, MAC, Port addressing, or VLAN, associated with the event. Once the Archiver 411 receives the request, the filtering policy is added to the collection of policies which comprise the second filtering policy. In preferred embodiments, this workload message could also include a tag including a retention parameter to retain the packets for a specified period of time. While the invention compasses any method for creating a filtering policy by a security application, the filtering policy may be created by an analytic analysis of packets by a security application applying a statistical analysis identifying the subset of interesting packets. The filtering policy is a prediction of which packets will be interesting in the future based on the packet characteristics of existing "interesting" packets as well as known general patterns of exploits.

In preferred embodiments of the invention, a plurality of security applications 409 feed filtering policies to the Archiver 411, and/or make requests to the Archiver 411 (or directly to the first and second repositories 407, 417) for stored packet information. In this way, a first security application, e.g., an incident forensics application, can retrieve packets stored in the second repository due to a filtering policy created by a second security application, e.g., an SIEM application.

A third filtering policy may be used to transfer network traffic information from the second repository 417 to the third repository 415. The third repository 415 is even more permanent storage than second repository 417 and may be different type of storage, e.g., tape, than the first or second repositories 407,417. In preferred embodiments, the third repository 415 is used for archiving information which is needed for compliance information, for example, for government regulations.

In embodiments of the invention, the first filtering policy used for storing the initial packet stream in the first repository 407 can be modified to add one or more systems and/or applications from multiple protocols from the originally defined first filtering policy. Events can be collected from operating systems, applications, firewalls and databases according to open, e.g., syslog, or proprietary protocols. Some events can be coalesced when they occur many times within a short time interval by the event source.

The second filtering policy used to describe the packets to be stored in the more permanent storage of the second repository 417 can be formatted using any combination of time-slices, network, IP or MAC addresses, and/or port numbers as descriptive network packet parameters.

Figure 5:
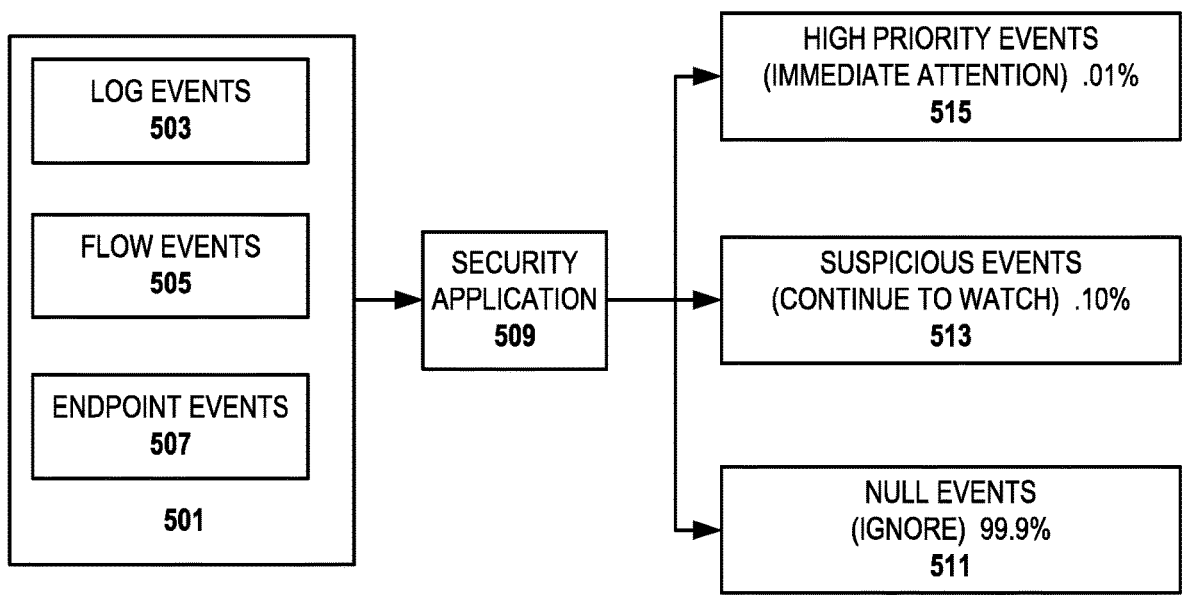
FIG. 5 is a high level flow diagram of labelling event types according to an embodiment of the invention.

FIG. 5 is a high level flow diagram of labelling event types according to an embodiment of the invention. In the figure, a stream of events 501, which in addition to raw events, also comprises sets of events which are grouped generally together as log events 503, flow events 505 and endpoint events 507. The stream of events is evaluated by security application 509. The security application 509 in one preferred embodiment is a SIEM application. A log event 503 is an event which is stored in an event log and may have event attributes such as time/date stamp, IP address, device identifiers, application identifiers, event IDs and event attributes which provide detailed information about a security event. Flow events 505 summarize network activity information in what is referred to as "flow records". Flow events represent network activity by normalizing IP addresses, ports, byte and packet counts, as well as other details, into a "flow", which effectively represents a session between two systems. Endpoint events 507 are associated with a particular network endpoint and can be organized and analyzed by the endpoint agent applications located at the network endpoint.

The SIEM security application 509 ingests vast amounts of events through logs, flow analytics, and endpoint analytics. The SIEM 509 will correlate and evaluate these events against a rules system with the intent of presenting significant security events to security analysts via a user interface. The vast majority of these events will be ignored as not relevant. The remaining events either need immediate attention or are marked as suspicious and should be more closely monitored in the future. Both of conditions needing immediate attention and marked as suspicious are relevant to the security analyst and would cause the packet capture system to mark and retain related traffic for longer periods.

FIG. 5 shows that of the plethora of network events and packets, very few are considered meaningful and need to be stored for forensic analysis. Null events 511 typically comprise 99.9% of the network events, and can be ignored from a security analysis perspective. Suspicious events 513 comprise 0.10% of the network events; they include events which may be indicative of exploits and need to be kept for further analysis. High priority events 515 require immediate attention and are generally events which are signatures of known exploits. On average, these events may comprise 0.01% of the total network events captured.

Figure 6:
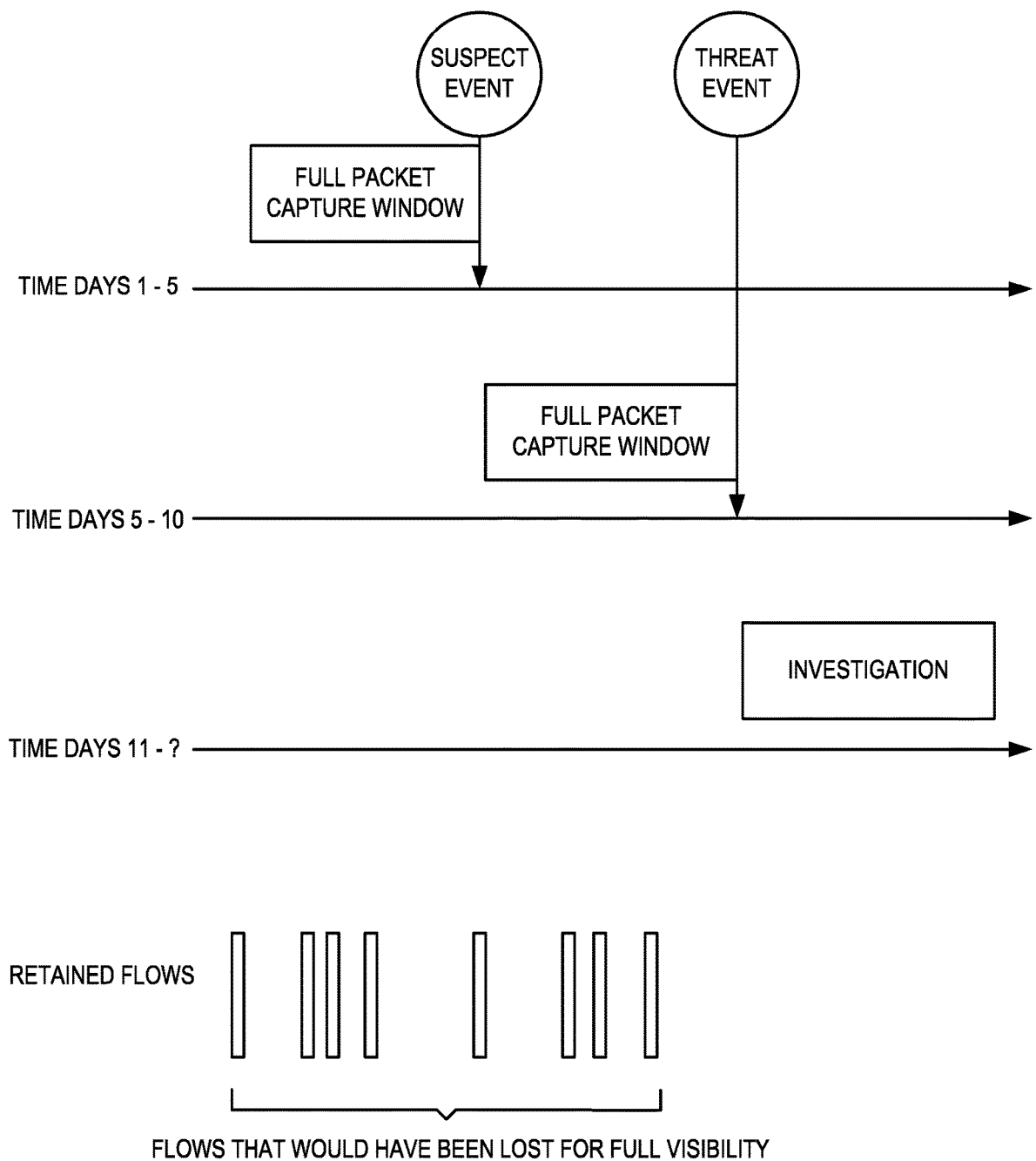
FIG. 6 is a diagram illustrating a time dependency for storing forensically interesting data so that it can be analyzed.

FIG. 6 is a diagram illustrating a time dependency for storing forensically interesting data so that it can be analyzed. In this example, suppose that the SIEM application identifies significant egress traffic from an IP address that has a non-desirable geo-location. The SIEM immediately rates this as a suspicious flow. The SIEM then correlates both a domain name and all IP addresses previously associated with the domain from its historical repository. All flows previous retained by the capture appliance (past history) to the event and all flows (future) following the event, containing either this IP address or domain name will be tagged for longer retention. The SIEM creates a filter policy and sends it to the archiver so the network packets are retained in the second repository.

Further, assume that that the full packet capture window, the retention time of packets in the first repository, is only 5 days due to network bandwidth and storage limitations. Yet further, assume that it takes the SIEM application until day 10 to conclusively raise the event level from suspicious to significant. In a normal packet capture environment of the prior art, all data aged 5 days or greater would be lost and there would be no visibility into the potential data loss. However, in the elastic storage environment of the present invention, data which is significant to the threat has been retained and the full visibility of the history of security violations is possible. The investigation, which takes place after day 10, continues to have access to the packet information in the second repository, even though the primary packet store in the first repository will have cycled through the network packet twice by day 10.

As an example of a situation where the present invention will find utility, suppose an HEM application is monitoring a target application log in/out activity for a set of users of the application. Data such as timestamp, application name, application host IP Address (12.234.16.113) are recorded. The SIEM application receives a message "Failed Login Attempt" as associated with the target application. The HEM application continues to monitor the network flow records for the target application server (12.234.16.113). Next, a new network flow is received: timestamp, client_IP (67.123.62.121), client_MAC, client_port, server_IP (12.234.16.113), bytes transferred, etc. The SIEM application can enrich the client_IP address with a host country name and notes that (67.123.62.121) corresponds to a non-USA country.

The rules engine of the SIEM continues to correlate the flow records with the log message and enriches the correlation with geo-location of the client IP address. The SIEM application raises a moderate level offense after seeing 3 failed login attempts from a foreign country within 5 minutes of each other and creates a new filtering policy which it sends to the archiver. The packet capture appliance is notified to now retain all traffic from this client address. Because the intrusion is classified as "moderate", in some embodiments of the invention, the filtering policy has a period of time, for example, two weeks, during which the policy will be in effect.

The SIEM application continues to correlate the flow records with the log messages and enriches the correlation with geo-location. Within days of the initial login failed login attempts, the sequence happens again. The SIEM application raises the event to a severe level offense after seeing continuous failed login attempts from a foreign country over an extended period. The packet capture box is notified to now retain all traffic from this client address forever or until told by the SIEM application that the filtering policy is no longer in effect.

In another example, the SIEM application may detect a network flow containing a successful login from a country not normally associated with an employee account. The application sends a new filtering policy to the archiver to retain packets associated with the employee account. Over months, packets originating from multiple countries over an extended time period for the same login account are received. This may indicate that either the employee is traveling or the account is being shared with or sold by hackers. As the network flows are gathered and indicate more activity, the filtering policies relating to the incidents can be changed. For example, at first, the filtering policy may direct the archiver to retain packets from the employee account for two weeks. A modified filtering policy may expand the packets to be retained to the IP addresses from which the employee's account was accessed. As the situation changes, the filtering policy may be further modified to remove the requirement to retain new packets from the now suspended employee account, but retain the IP addresses from which the employee's account was accessed to analyze other, possibly malicious activity originating from these addresses.

Figure 7:
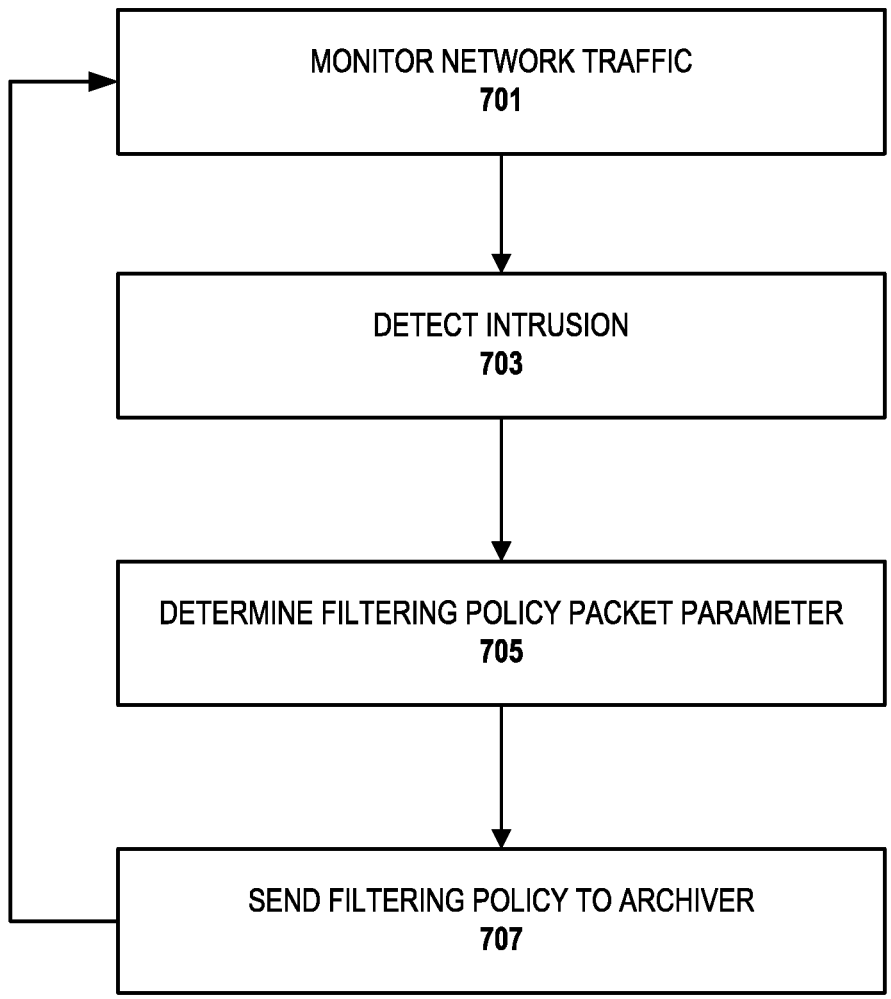
FIG. 7 is a flow diagram of creating a filtering policy for packets for long term storage in an embodiment of the invention.

FIG. 7 is a flow diagram of creating a filtering policy for packets for long term storage in an embodiment of the invention. The process begins when the security application is monitoring the network traffic for intrusions or other suspicious traffic, in step 701. As is known to those skilled in the art, the actual monitoring may be performed by third party devices. The security application will subscribe the events, flows or logs created by those devices. From the network traffic, the security application detects what appears to be a suspected intrusion in step 703. In many cases, the suspected intrusion will be a new type of attack which is not presently recognized as a known attack signature. So a new filtering policy needs to be constructed so that related future traffic can be studied.

Next, the security application determines what the filtering policy packet parameters should be, i.e. what packet characteristics describe similar or related packets and what the retention parameter should be used for "interesting" packets connected to the incident, step 705. For example, the security application may detect a suspicious packet from a particular IP address and determines that the packets from that IP address should be retained for a period of time, for example, two weeks. So the security application will create a filtering policy which stores all of the packets originating from the IP address in question and determines that the filtering policy in effect for two weeks. Then, the security application will send the newly created filtering policy to the archiver to add to the collection of filtering policies in effect, step 707. As shown, the process continues so that when new situations and incidents are identified by the security application, new filtering policies can be created and sent to the archiver. The security application may continue to monitor incidents and determine that an existing filtering policy for an incident should be modified. In embodiments of the invention where multiple security applications create filtering policies for the archiver, a similar process is carried out in parallel for each of the security applications.

Figure 8:
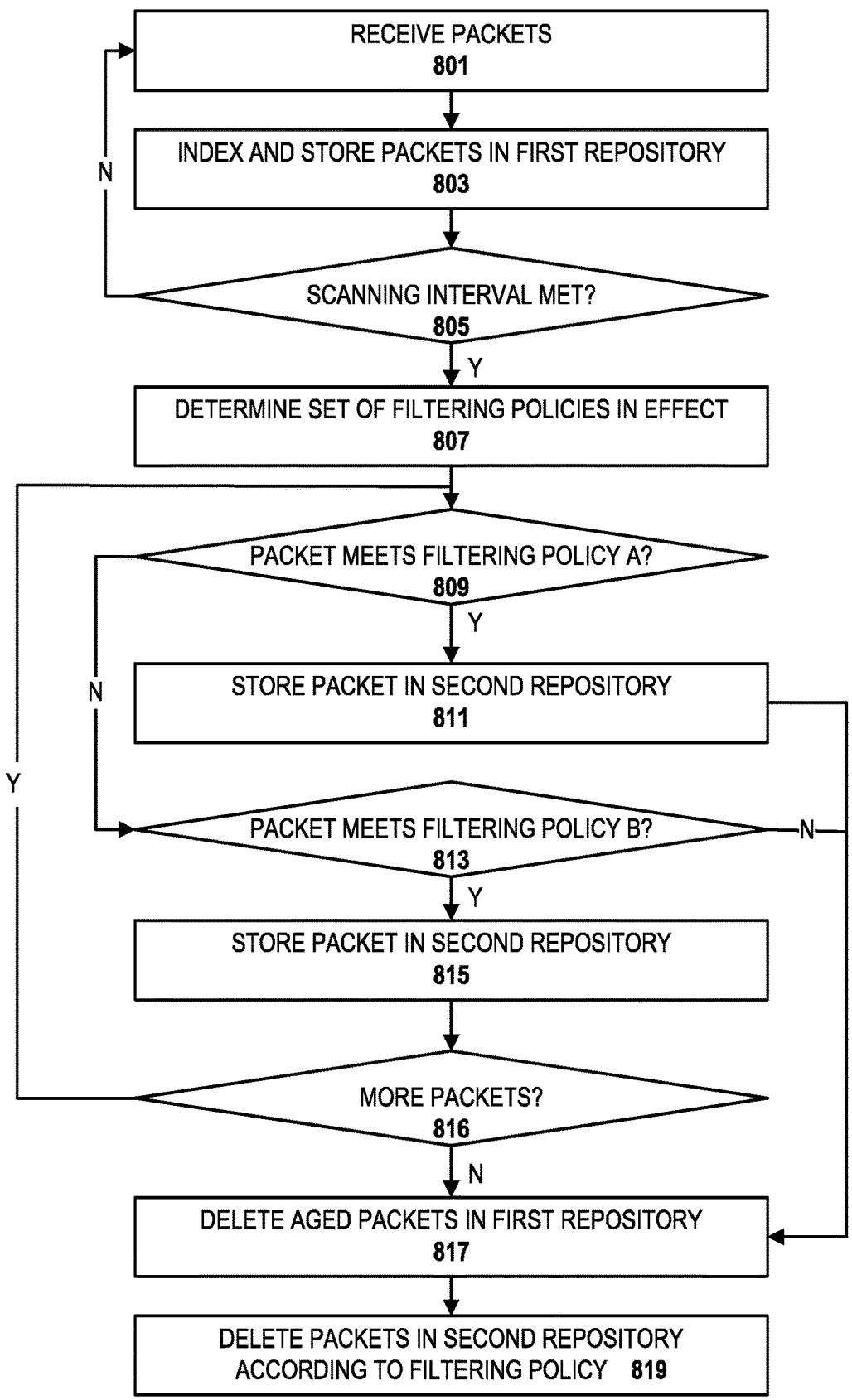
FIG. 8 is a flow diagram of managing storage of packets in an embodiment of the invention.

FIG. 8 is a flow diagram of managing storage of packets in an embodiment of the invention. The process begins as the packet capture utility begins to receive packets from the configured endpoints, step 801. The packet capture utility indexes and stores the packets in first repository, step 803.

The process continues in the archiver component which wakes up and determines whether the scanning interval met in step 805. If not, the process continues with packet capture in step 801. If so, the archiver determines which set of filtering policies are in effect, step 807. As is mentioned above, the "second" filtering policy used for determining which packets stored in first repository should be copied/transferred to second repository can be a collection of filtering policies. For simplicity in illustration, the second filtering policy is comprised of two filtering policies currently in effect, Policy A and Policy B. In step 809, the archiver determines whether the packet meets filtering policy A. If so, the packet is stored/copied into the second repository, step 811. If not, the archiver determines whether packet meets filtering policy B in step 813. If so, the packet is stored/copied into the second repository, step 815. In step 816, a test is performed to determine whether there are more packets in the first repository to review. Rather than reviewing packets in the repository, the index could be searched for this process. If so, the process loops back to step 807 until there are no more packets to review.

Contemporaneously, but possibly asynchronously, the packets in the first repository are reviewed so that aged packets can be deleted in first repository, step 817. This step can be performed once the first repository is full, e.g., using a FIFO policy, or at a predetermined time interval, disposing of packets once they have reached a predetermined age in the repository. Next, in step 819, packets in second repository are deleted according to the filtering policy which caused them to be archived. Alternatively, like the first repository, packets could be stored in the second repository until it is full and then old packets are deleted on a FIFO basis. Once packets are removed from the repositories, in preferred embodiments, the index is updated to reflect the removal.

Figure 9:
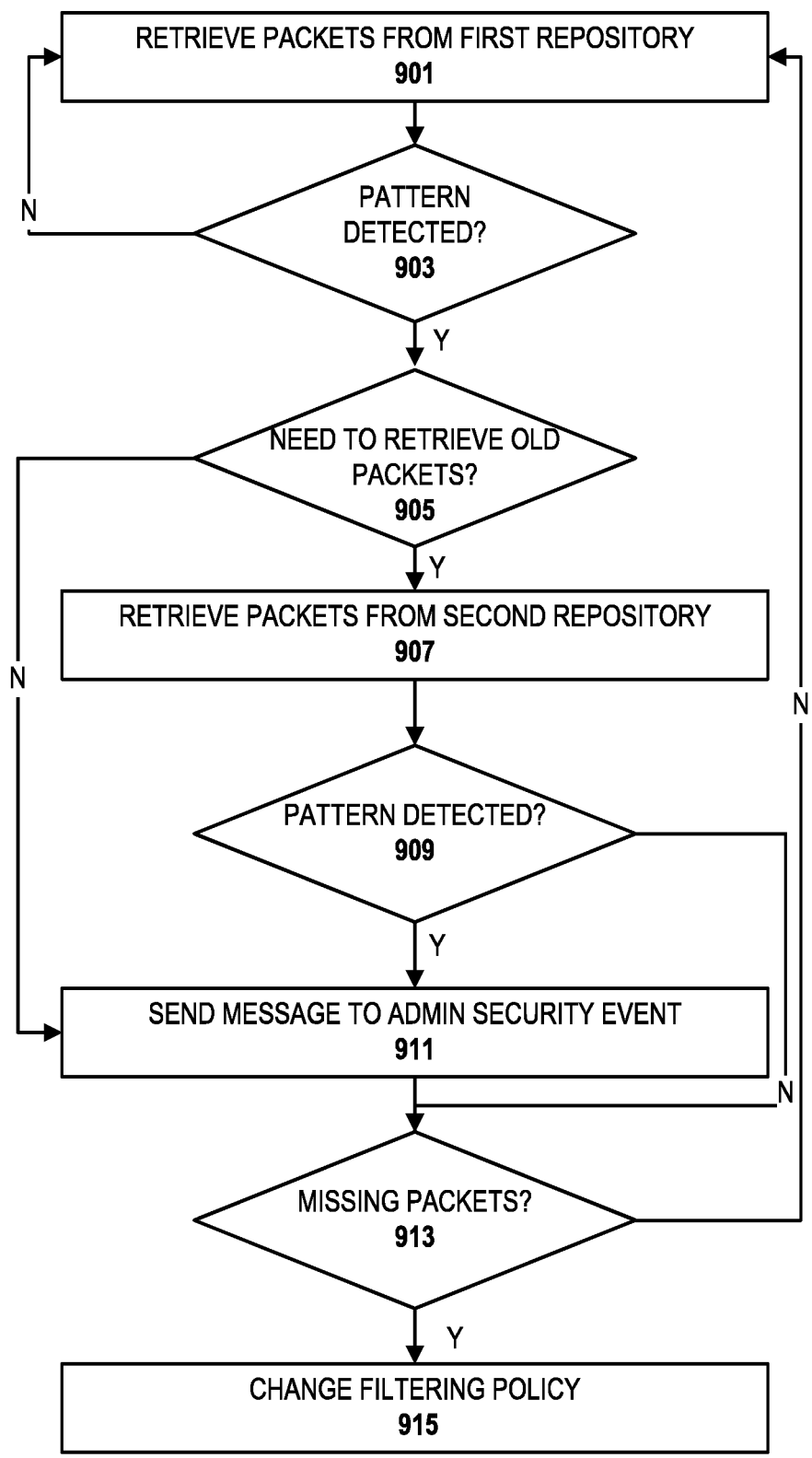
FIG. 9 is a flow diagram of retrieving packets from short term and archival storage.

FIG. 9 is a flow diagram of retrieving packets from short term and archival storage in one preferred embodiment. In this embodiment, a security application will retrieve stored and indexed packets from the first and second repositories to determine whether an intrusion or other security event has been detected. If this is a first request, the request parameters may include a filtering policy to be added to the collection of filtering policies which comprise the second filtering policy. In the embodiment, packets from first repository are retrieved preferentially, step 901. If a pattern is detected, step 903, a test is performed to determine if there is a need to retrieve old packets, i.e. ones in the second repository, step 905. If so, in step 907, the security application retrieves packets from second repository. For each of the retrieval steps, the index created by the indexer may be utilized. The retrieval process itself will typically involve cooperation between the requesting security application and the packet capture environment. That is, the security application will make a request for packets meeting certain characteristics and the packet capture environment will fulfill that request. In step 909, a test is performed to determine whether a pattern is detected.

If a pattern is detected, in step 911, a message is sent to an administrator containing a security event indicated by the pattern. If a pattern is not detected, particularly if some packets are suggestive of a security event, a determination is made whether there are or might be missing packets due to an incomplete filtering policy, step 913. If the examination determines that the filtering policy is incomplete, in step 915, the filtering policy is changed. Changing the filtering policy is typically accomplished by the security application, either by modifying an existing filtering policy or by issuing a new filtering policy. In alternative embodiments, the Archiver will modify an existing filtering policy.

The present invention has many advantages over the prior art. The invention allows drastically reduced storage requirements, a longer term visibility of threats, and a big data analytic reduction. By retaining only the packets of interest, rather than all packets, storage requirement are reduced on the order of a hundred for the same coverage of network intrusions. By allowing a time period, during which the security application creates the filtering policies before copying to the second repository, loss of data is minimized. By allowing multiple security applications to interact with the packet capture device, filters developed by one security component will cause "interesting" packets to be retained for use of another security component.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

The invention claimed is:

1. A method for operating a packet capture utility for selectively storing network packet data comprising:
   indexing and storing captured network packets by the packet capture utility, the network packets captured from an initial packet stream as full network packets in a first repository;
   scanning the indexed network packets stored in the first repository on a periodic basis by the packet capture utility according to a second network packet filtering policy to identify a subset of the indexed network packets, wherein the second network packet filtering policy is a collection of network packet filtering policies from a set of security applications, each of the network packet filtering policies is based on a prediction of network packets which are forensically interesting to a security issue; and
   storing the identified subset of network packets from the first repository in a second repository as full network packets by the packet capture utility;
   receiving a request from one of the set of security applications for network packets which satisfy a new network filtering policy by the packet capture utility;
   retrieving full network packets from both the first and second repositories which satisfy the new network filtering policy by the packet capture utility;
   sending the retrieved network packets to the requesting security application by the packet capture utility; and
   including the new network filtering policy in the collection of network packet filtering policies so that a next scan of the first repository will include the new filtering policy as part of the second network packet filtering policy by the packet capture utility;
   wherein the scanning is repeated at a scan interval which is less than a packet retention time in the first repository and greater than an average amount of time required by the set of security applications to create a new packet filtering policy to detect forensically interesting network packets.

2. The method as recited in claim 1, further comprising receiving respective ones of the collection of network packet filtering policies from different ones of the set of security applications.

3. The method as recited in claim 1, wherein ones of the collection of network packet filtering policies have expiration times so that the second network packet filtering policy changes in time ones of the collection of network packet filtering policies expire and new network packet filtering policies are added to the collection of network packet filtering policies.

4. The method as recited in claim 1, wherein ones of the collection of network packet filtering policies are created based on an analytic analysis of packets by a security application applying a statistical analysis.

5. The method as recited in claim 1, further comprising:
   by the packet capture utility, converting the request from one of the set of security applications for network packets into the new network filtering policy; and
   after conversion, adding the new network packet filtering policy to the collection of network packet filtering policies.

6. The method as recited in claim 1, further comprising:
   specifying a first retention period for network packets stored in the first repository;
   specifying a second retention period for network packets stored in the second repository, wherein the second retention period is longer than the first retention period;
   wherein individual network packets are stored in the second repository for the second retention period as a default, individual network packets in the second repository are stored according to a retention period specified in a respective one of the collection of network filtering policies which caused the individual network packet to be stored in the second repository.

7. The method as recited in claim 1, further comprising:
   by the packet capture utility, scanning the network packets stored in the second repository on a periodic basis according to a third network packet filtering policy to identifying a subset of network packets needed for compliance information; and storing the subset of network packets needed for compliance information in a third repository, wherein the third repository has a third retention period longer than the second retention period.

8. An apparatus, comprising:

a processor;

computer memory holding computer program instructions executed by the processor operating a packet capture utility, the computer program instructions comprising:

packet capture utility code for scanning the indexed network packets stored in the first repository on a periodic basis according to a second network packet filtering policy to identify a subset of the indexed network packets, wherein the second network packet filtering policy is a collection of network packet filtering policies from a set of security applications, each of the network packet filtering policies is based on a prediction of network packets which are forensically interesting to a security issue; and packet capture utility code for storing the identified subset of network packets from the first repository in a second repository as full network packets;

packet capture utility code for receiving a request from one of the set of security applications for network packets which satisfy a new network filtering policy;

packet capture utility code for retrieving full network packets from both the first and second repositories which satisfy the new network filtering policy;

packet capture utility code for sending the retrieved network packets to the requesting security application; and packet capture utility code for including the new network filtering policy in the collection of network packet filtering policies so that a next scan of the first repository will include the new filtering policy as part of the second network packet filtering policy;

wherein the scanning is repeated at a scan interval which is less than a packet retention time in the first repository and greater than an average amount of time required by the set of security applications to create a new packet filtering policy to detect forensically interesting network packets.

9. The apparatus as recited in claim 8, wherein respective ones of the collection of network packet filtering policies are received from different ones of the set of security applications.

10. The apparatus as recited in claim 8, further comprising packet capture utility code for changing the second network policy as ones of the collection of network packet filtering policies expire and new network packet filtering policies are added to the collection of network packet filtering policies.

11. The apparatus as recited in claim 8, further comprising:

packet capture utility code for converting the request from one of the set of security applications for network packets into the new network filtering policy; and packet capture utility code for adding the new network packet filtering policy to the collection of network packet filtering policies.

12. The apparatus as recited in claim 8, further comprising:

packet capture utility code for specifying a first retention period for network packets stored in the first repository;

packet capture utility code for specifying a second retention period for network packets stored in the second repository, wherein the second retention period is longer than the first retention period; and packet capture utility code for determining retention times for individual network packets stored in the second repository, using the second retention period as a default, but determining whether individual network packets in the second repository are stored according to a retention period specified in a respective one of the collection of network filtering policies which caused the individual network packet to be stored in the second repository.

13. A computer program product stored in a non-transitory computer readable medium for use in a data processing system, the computer program product holding computer program instructions executed by the data processing system for operating a packet capture utility, the computer program instructions comprising:

packet capture utility code for scanning the indexed network packets stored in the first repository on a periodic basis according to a second network packet filtering policy to identify a subset of the indexed network packets, wherein the second network packet filtering policy is a collection of network packet filtering policies from a set of security applications, each of the network packet filtering policies is based on a prediction of network packets which are forensically interesting to a security issue; and packet capture utility code for storing the identified subset of network packets from the first repository in a second repository as full network packets;

packet capture utility code for receiving a request from one of the set of security applications for network packets which satisfy a new network filtering policy;

packet capture utility code for retrieving full network packets from both the first and second repositories which satisfy the new network filtering policy;

packet capture utility code for sending the retrieved network packets to the requesting security application; and packet capture utility code for including the new network filtering policy in the collection of network packet filtering policies so that a next scan of the first repository will include the new filtering policy as part of the second network packet filtering policy;

wherein the scanning is repeated at a scan interval which is less than a packet retention time in the first repository and greater than an average amount of time required by the set of security applications to create a new packet filtering policy to detect forensically interesting network packets.

14. The computer program product as recited in claim 13, further comprising packet capture utility code for changing the second network policy as ones of the collection of network packet filtering policies expire and new network packet filtering policies are added to the collection of network packet filtering policies.

15. The computer program product as recited in claim 13, further comprising:

packet capture utility code for converting the request from one of the set of security applications for network packets into the new network filtering policy; and packet capture utility code for adding the new network packet filtering policy to the collection of network packet filtering policies.

16. The computer program product as recited in claim 13, further comprising:
- packet capture utility code for specifying a first retention period for network packets stored in the first repository;
- packet capture utility code for specifying a second retention period for network packets stored in the second repository, wherein the second retention period is longer than the first retention period; and
- packet capture utility code for determining retention times for individual network packets stored in the second repository, using the second retention period as a default, but determining whether individual network packets in the second repository are stored according to a retention period specified in a respective one of the collection of network filtering policies which caused the individual network packet to be stored in the second repository.

17. The computer program product as recited in claim 13, further comprising:
- packet capture utility code for scanning the network packets stored in the second repository on a periodic basis according to a third network packet filtering policy to identifying a subset of network packets needed for compliance information; and
- packet capture utility code for storing the subset of network packets needed for compliance information in a third repository, wherein the third repository has a third retention period longer than the second retention period.

\* \* \* \* \*